(12) United States Patent
Guo et al.

(10) Patent No.: US 10,924,227 B2
(45) Date of Patent: Feb. 16, 2021

(54) RADIO FRAME SENDING AND RECEIVING METHODS AND APPARATUS

(71) Applicant: HUAWEI TECHNOLOGIES CO., LTD., Shenzhen (CN)

(72) Inventors: Yuchen Guo, Shenzhen (CN); Jian Yu, Shenzhen (CN); Xun Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/186,095

(22) Filed: Nov. 9, 2018

(65) Prior Publication Data

US 2019/0081748 A1   Mar. 14, 2019

Related U.S. Application Data

(63) Continuation of application No. PCT/CN2017/082167, filed on Apr. 27, 2017.

(30) Foreign Application Priority Data

May 10, 2016 (CN) .......................... 2016 1 0305870

(51) Int. Cl.
*H04L 5/00* (2006.01)
*H04B 5/00* (2006.01)
(Continued)

(52) U.S. Cl.
CPC ............. *H04L 5/0007* (2013.01); *H04B 5/00* (2013.01); *H04L 1/00* (2013.01); *H04L 1/0028* (2013.01);
(Continued)

(58) Field of Classification Search
CPC ...... H04L 5/0007; H04W 84/12; H04W 88/08
See application file for complete search history.

(56) References Cited

U.S. PATENT DOCUMENTS 6,115,394 A     9/2000 Balachandran et al.
2011/0188462 A1  8/2011 Yoo et al.
(Continued)

FOREIGN PATENT DOCUMENTS

CN    102843755 A   12/2012
CN    103001681 A    3/2013
(Continued)

OTHER PUBLICATIONS

Boris Bellalta, IEEE 802.11ax: High-Efficiency WLANs. IEEE Wireless Communications• Feb. 2016, 9 pages.
(Continued)

*Primary Examiner* — Alex Skripnikov
*Assistant Examiner* — Sharmin Chowdhury
(74) *Attorney, Agent, or Firm* — Leydig, Voit & Mayer, Ltd.

(57) ABSTRACT

A radio frame sending\receiving method and apparatus is provided, including: generating, by a transmit end, a radio frame, where the radio frame includes one or more station information fields, a length of each station information field is 2K bytes, where K is a natural number, and a value of a bit B16j+11 in each station information field is set to 1, where j=1, 2, 3, . . . , K−1; and sending the radio frame.

16 Claims, 10 Drawing Sheets

(51) Int. Cl.
    *H04L 1/00*      (2006.01)
    *H04L 1/06*      (2006.01)
    H04W 84/12       (2009.01)
    H04W 88/08       (2009.01)
(52) U.S. Cl.
    CPC .......... *H04L 1/0075* (2013.01); *H04L 1/0079*
         (2013.01); *H04L 1/06* (2013.01); *H04W 84/12*
                    (2013.01); *H04W 88/08* (2013.01)

(56)　　　　　References Cited

U.S. PATENT DOCUMENTS

| | | |
|---|---|---|
| 2011/0243066 A1 | 10/2011 | Nayeb Nazar et al. |
| 2014/0185506 A1 | 7/2014 | Yang et al. |
| 2015/0372795 A1 | 12/2015 | Wu et al. |
| 2016/0081075 A1 | 3/2016 | Kim et al. |
| 2016/0262051 A1* | 9/2016 | Merlin .................. H04L 5/0057 |
| 2017/0070914 A1* | 3/2017 | Chun .................... H04L 5/0053 |
| 2017/0280462 A1 | 9/2017 | Chun et al. |
| 2017/0303154 A1* | 10/2017 | Merlin .................. H04W 24/10 |
| 2017/0339643 A1 | 11/2017 | Yang et al. |
| 2018/0115997 A1 | 4/2018 | Son et al. |

FOREIGN PATENT DOCUMENTS

| | | |
|---|---|---|
| CN | 103002478 A | 3/2013 |
| CN | 103095426 A | 5/2013 |
| JP | 2002506321 A | 2/2002 |
| JP | 2013518535 A | 5/2013 |
| KR | 20120093319 A | 8/2012 |
| KR | 20130005289 A | 1/2013 |
| RU | 2557164 C2 | 7/2015 |
| WO | 2012044865 A1 | 4/2012 |
| WO | 2015174725 A1 | 11/2015 |
| WO | 2016028124 A1 | 2/2016 |

OTHER PUBLICATIONS

IEEE P802.11ax™ /D0.1, Mar. 2016, Draft Standard for Information technology—Telecommunications and information exchange between systems Local and metropolitan area networks—Specific requirements. Part 11: Wireless LAN Medium Access Control (MAC) and Physical Layer (PHY) Specifications. Amendment 6: Enhancements for high efficiency in frequency bands between 1 GHz and 6 GHz, 221 pages.

Narendar Madhavan et al, HE NDPA Frame format. Mar. 11, 2016, 15 pages.

Tan Kai et al, New WLAN standard IEEE 802.11ax. Guangdong communication technology, Oct. 15, 2015, 5 pages.

Madhavan et al., "Regarding HE NDPA frame for DL Sounding Sequence," IEEE 802.11-16/0091r2, pp. 1-10, Institute of Electrical and Electronics Engineers, New York, New York (Jan. 18, 2016).

KR/20187035506, Notice of Allowance, dated Oct. 23, 2020.

\* cited by examiner

RADIO FRAME SENDING AND RECEIVING METHODS AND APPARATUS

CROSS-REFERENCE TO RELATED APPLICATIONS

This application is a continuation of International Application No. PCT/CN2017/082167, filed on Apr. 27, 2017, which claims priority to Chinese Patent Application No. 201610305870.9, filed on May 10, 2016, The disclosures of the aforementioned applications are hereby incorporated by reference in their entireties.

TECHNICAL FIELD

Embodiments of the present application relate to communications technologies, and in particular, to radio frame sending and receiving methods and an apparatus.

BACKGROUND

OFDM (orthogonal frequency division multiplexing) is a basic transmission manner in current wireless communication, and is widely applied to wireless communications systems such as LTE, WiMAX, and WiFi. In addition, OFDM is further applied to fixed network transmission, for example, transmission manners such as a fiber, a copper stranded wire, and a cable. A basic principle of OFDM is as follows: Subcarrier spacing is compressed to a minimum in an allowable range of subcarrier orthogonality. On the one hand, this can ensure that multiple parallel paths that do not interfere with each other are formed; on the other hand, this can improve frequency utilization efficiency of a system.

Further, because OFDM has the foregoing characteristic, if subcarriers of OFDM that do not interfere with each other are allocated to multiple users, access or data transmission of the multiple users can be implemented by using OFDM. This is referred to as OFDMA (orthogonal frequency division multiple access). In the OFDMA manner, data sending means that a transmit end sends, to multiple receive ends associated with subcarriers/subchannels corresponding to the receive ends, data of the receive ends by using the subcarriers/subchannels. In the OFDMA sending manner, data on the subcarriers/subchannels needs to be synchronously sent. Data of users keeps orthogonal by using subcarriers/subchannels of the users during synchronous sending. OFDMA can flexibly and conveniently schedule multiple users to perform simultaneous transmission, and this helps use OFDMA to implement a multiuser diversity effect. In addition, OFDMA can conveniently support multiple discrete subchannels, and therefore, OFDMA can more effectively use a blank frequency band.

Similarly, as a manner of supporting multiuser transmission by using parallel channels, MU-MIMO multi-user multiple-input multiple-output) uses a spatial dimension to implement parallel channels, and is provided to multiple users as a transmission method. However, in this manner, a transmit end (downlink, DL MU-MIMO) or a receive end (uplink, UL MU-MIMIO) needs to have all or some channel information; otherwise, the receive end cannot correctly obtain multiple effective signals by means of demodulation, and consequently, transmission fails. For DL MU-MIMO, the transmit end uses channel state information (CSI) to form a transmitting beam, and multiple spatial flows are distinguished at the transmit end. For UL MU-MIMO, the receive end needs to use channel state information to form a receiving beam, and multiple spatial flows are distinguished at the receive end. In particular, for DL MU-MIMO, in order that the transmit end can obtain the channel state information, the transmit end needs to send a training sequence, so that multiple receive ends estimate a channel, and feed back the estimated channel state information to the transmit end.

On the other hand, a sequence characteristic of a WLAN (Wireless LAN) is a data transmission method in a unit of a frame. That is, a frame structure that can make full use of the characteristic of OFDMA is required, so as to implement highly efficient transmission.

SUMMARY

Embodiments of the present application provide a radio frame transmission method, to overcome disadvantages in the prior art, and improve efficiency of radio frame communication.

An aspect provides a radio frame sending method, including: generating, by a transmit end, a radio frame, where the radio frame includes one or more station information fields, a length of each station information field is 2K bytes, where K is a natural number, and a value of a bit B16j+11 in each station information field is set to 1, where j=1, 2, 3, . . . , K−1; and sending the radio frame.

Similarly, in another aspect, a radio frame sending method includes:

generating, by a transmit end, a radio frame, where the radio frame includes one or more station information fields (STA info fields), a length of each station information field is 2K bytes, where K is a natural number such as 1, 2, 3, . . . , and a value of a bit B16j in each station information field is set to 1, where j=1, 2, 3, . . . , K−1; and sending the radio frame.

Correspondingly, a radio frame receiving method is provided, including:

receiving a radio frame, where the radio frame includes one or more station information fields, a length of each station information field is 2K bytes, where K is a natural number, and a value of a bit B16j+11 in each station information field is set to 1, where j=1, 2, 3, . . . , K−1; and parsing the radio frame, and performing processing according to the value of the bit B16j+11.

Similarly, a radio frame receiving method includes:

receiving a radio frame, where the radio frame includes one or more station information fields (STA info fields), a length of each station information field is 2K bytes, where K is a natural number such as 1, 2, 3, . . . , and a value of a bit B16j in each station information field is set to 1, where j=1, 2, 3, . . . , K−1; and parsing the radio frame, and performing processing according to the value of the bit B16j.

The embodiments of the present application further correspondingly provide an apparatus for implementing the foregoing methods, such as a chip, a station, or an access point.

BRIEF DESCRIPTION OF DRAWINGS

To describe the technical solutions in the embodiments of the present application or in the prior art more clearly, the following briefly describes the accompanying drawings required for describing the embodiments or the prior art. Apparently, the accompanying drawings in the following description show some embodiments of the present application, and a person of ordinary skill in the art may still derive other drawings from these accompanying drawings without creative efforts.

DESCRIPTION OF EMBODIMENTS

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are some but not all of the embodiments of the present application. All other embodiments obtained by a person of ordinary skill in the art based on the embodiments of the present application without creative efforts shall fall within the protection scope of the present application.

Definitions of Abbreviations/Acronyms and Key Terms

Figure 1:
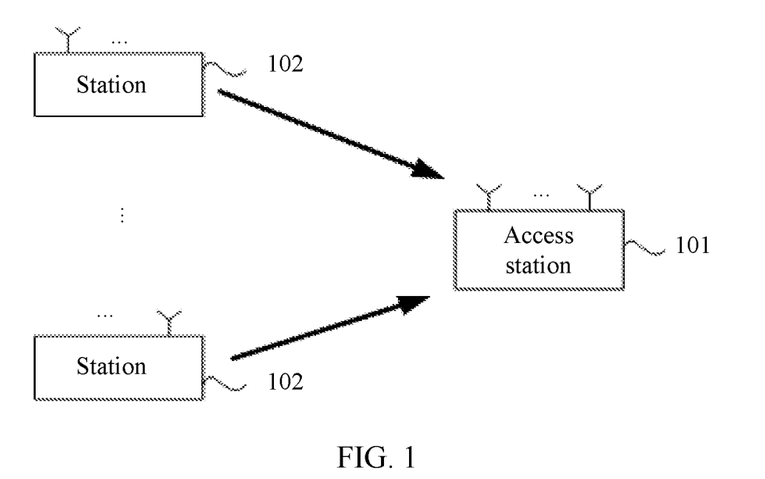
FIG. 1 is a schematic architectural diagram of a system according to an embodiment of the present application.
Figure 2:
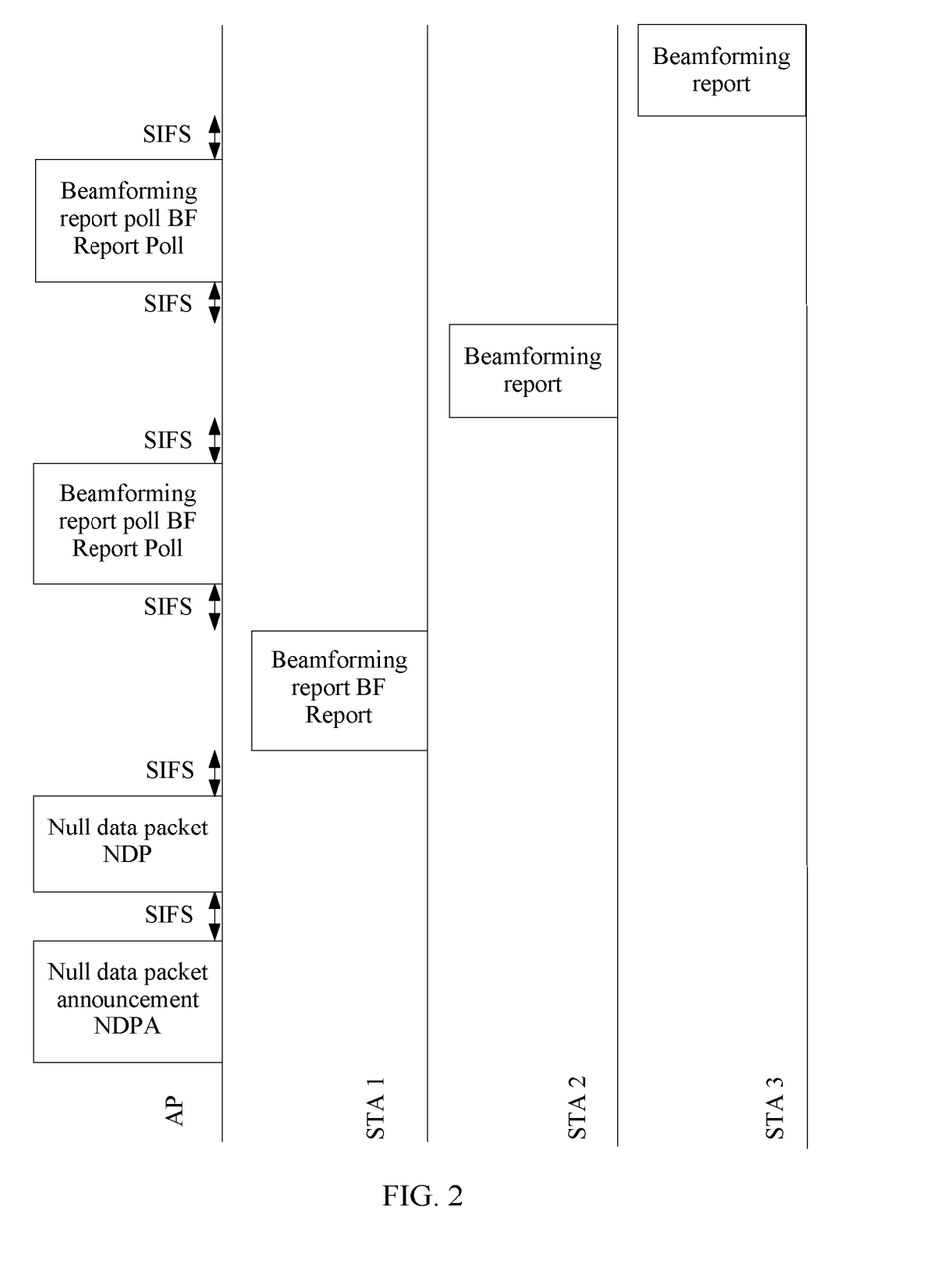
FIG. 2 is a simple schematic diagram of a process of feeding back channel state information of multiple users.
Figure 3:
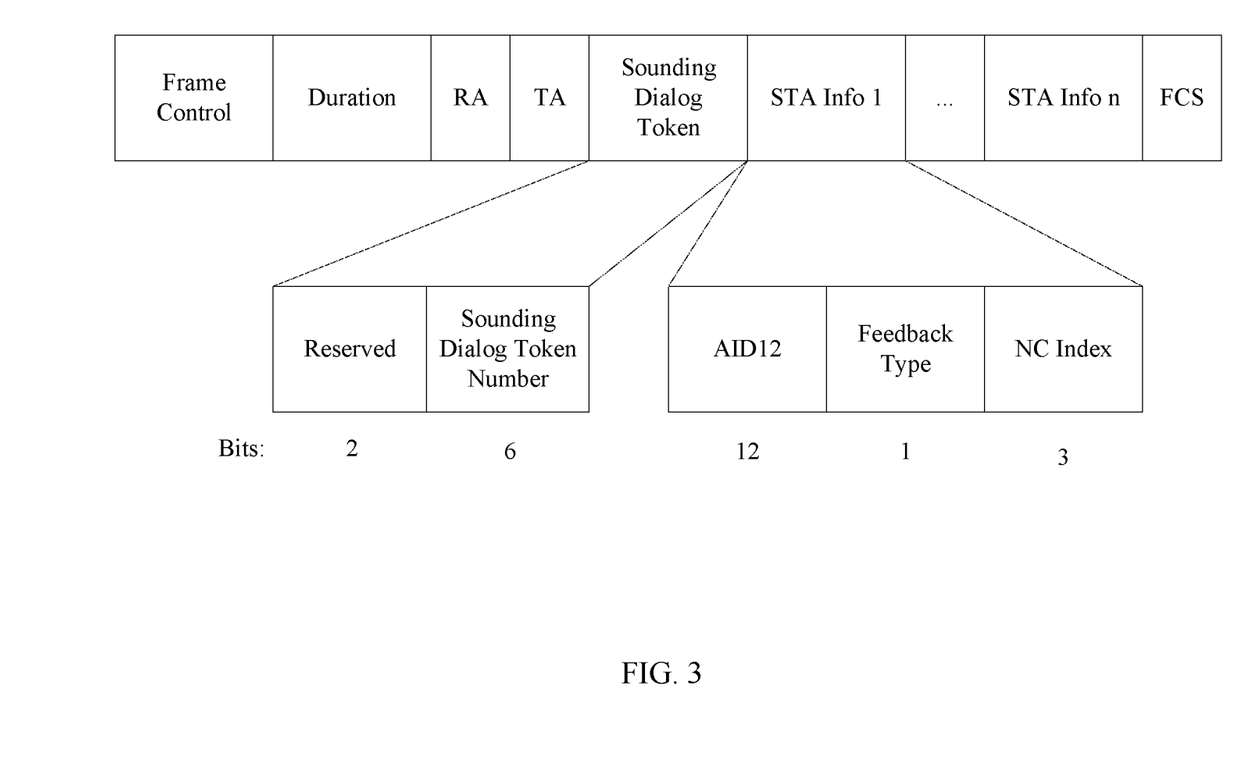
FIG. 3 is a simple schematic diagram of a format of an NDPA frame.

L-XXX Legacy XXX Field
SISO Single-Input Single-Output
OFDM Orthogonal Frequency Division Multiplexing
WLAN Wireless Local Area Network
CP Cyclic Prefix
STF Short Training Field
LTF Long Training Field
SIG Signal Field
VHT Very High Throughput
HE Highly efficient
PHY Physical (Layer)
MAC Medium Access Control (Layer)
MCS Modulation and Coding Scheme
SINR Signal to Interference Plus Noise Ratio
BCC Binary Convolution Code
CRC Cyclic Redundancy Code
STA Station
AP Access Point
MU-MIMO Multi-User Multiple-Input Multiple-Output
GID/Group ID Group Identifier
OFDMA Orthogonal Frequency Division Multiple Access
WLAN Wireless Local Area Network
NSTS Number of Space-Time Streams
STBC Space Time Block Coding
BF Beamforming
LDPC Low-Density Parity-Check Code
DL Downlink
UL Uplink
SIFS Short Interframe Space
NDP Null Data Packet
NDPA Null Data Packet Announcement
BF Beamforming As shown in FIG. 1, FIG. 1 is a simple schematic structural diagram of a wireless local area network WLAN. The WLAN includes an access station or an access point 101, and one or more stations 102. Referring to FIG. 2, FIG. 2 is a simple schematic diagram of a process of feeding back channel state information of multiple users. An AP continuously sends an NDPA (null data packet announcement) and an NDP (null data packet). A receive end estimates channel state information according to an indication of the NDPA and an LTF (long training field) of the NDP, generates a beamforming report (BF Report) frame, and feeds back the estimated channel state information to the AP (access point). In the feedback process, the AP sends beamforming report poll (BF Report Poll) frames to query STAs (station) indicated in the NDPA one by one, to obtain BF reports from these STAs. This one-by-one query method causes relatively large overheads. In addition, an existing format of an NDPA frame is shown in FIG. 3.

Figure 4:
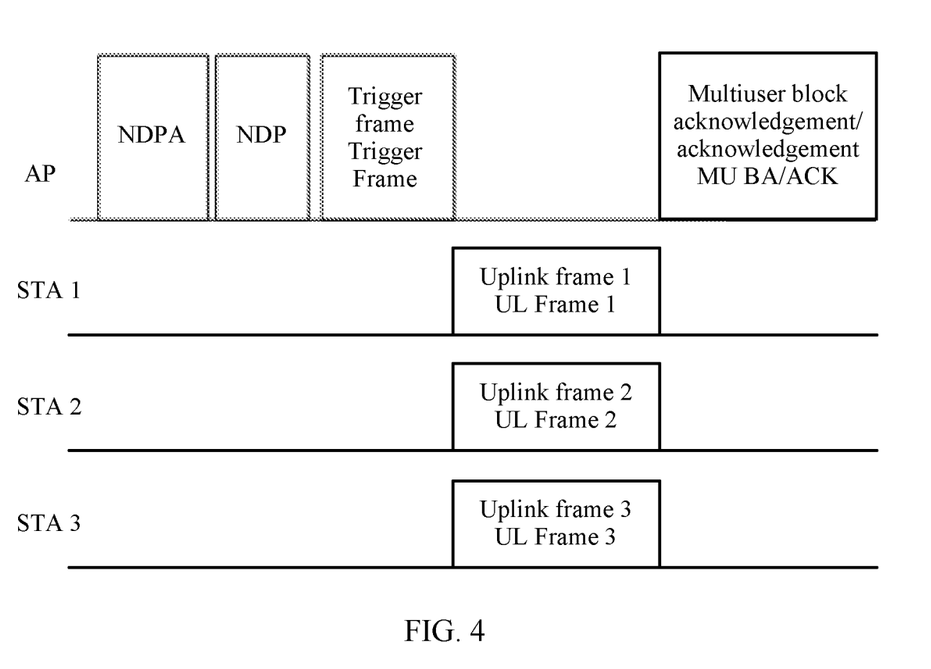
FIG. 4 is a simple schematic diagram of an uplink OFDMA/MU-MIMO transmission process.

To reduce the overheads, as shown in FIG. 4, FIG. 4 is a simple schematic diagram of an uplink OFDMA/MU-MIMO transmission process. UL OFDMA is introduced into the process to implement parallel transmission of BF reports of multiple users. However, UL OFDMA requires a trigger frame to implement synchronization and indication of information such as uplink resource allocation.

A characteristic of OFDMA is introduced into the next-generation standard, i.e. 802.11ax, and a STA may need to measure information of partial channel(s) in an entire bandwidth. Therefore, an AP may indicate, in an NDPA frame, bandwidth information that a STA needs to measure, and this part of information may be indicated by an extra bit. However, a user information part in a current VHT NDPA frame has only 16 bits, and the 16 bits all carry useful information. Therefore, in 802.11ax standard, a radio frame (such as an HE NDPA frame) that complies with the 802.11ax standard needs to implement highly efficient transmission, by using the characteristic of OFDMA.

An embodiment of the present application provides a radio frame sending method, including:

generating, by a transmit end, a radio frame, where the radio frame includes one or more station information fields, STA info fields, a length of each station information field is 2K bytes, where K is a natural number such as 1, 2, 3, . . . , and a value of a bit B16j+11 in each station information field is set to 1, where j=1, 2, 3, . . . , K−1; and sending the radio frame. In the embodiment, a most significant bit in the station information field is on a right side.

In another similar solution, the most significant bit in the station information field may be on a left side. In this case, similarly, a radio frame sending method is provided, including:

generating, by a transmit end, a radio frame, where the radio frame includes:

one or more station information fields, STA info fields, a length of each station information field is 2K bytes, where K is a natural number such as 1, 2, 3, . . . , and a value of a bit B16j in each station information field is set to 1, where j=1, 2, 3, . . . , K−1; and sending the radio frame.

In a specific example, the radio frame is an NDPA frame or a trigger frame, and especially is an NDPA frame or a trigger frame with a data structure that complies with the 802.11ax standard. For example, the NDPA frame or the trigger frame may be referred to as an HE NDPA or an HE trigger.

By using the foregoing frame structure, on a receive side, after receiving the radio frame, a station that complies with the 802.11ax standard parses the radio frame and performs subsequent processing. For a station such as a VHT STA that does not comply with the 802.11ax standard, the station sets each STA info field to 2 bytes by default. The station first reads an AID12 information field, and continues to read next 2 bytes if a read value does not match an AID of the station. The station does not obtain, from subsequent 4 bits, information sent to the station, until the read value matches the AID of the station. When parsing the frame, the VHT STA is able to determine, based on the value of the bit B16j+11 or the value of the bit B16j, that the STA info field does not carry related information of the VHT STA. That is, by the indication of that a bit at the foregoing location is 1, the VHT STA determines that the STA info field does not carry information of the VHT STA. Therefore, the VHT STA may no longer continue to process the STA info field. (This is described in detail in the following example.)

An HE NDPA is used as an example below for detailed description.

Example 1

A transmit end generates an HE NDPA frame. The HE NDPA frame includes n STA info fields, and n is a natural number. Each STA info field includes or carries three fields: an association identifier field (AID12), a feedback type field (Feedback Type), and an index of number of columns field (Nc index), and may further include or carry another field, for example, one of or any combination of fields such as an index of number of rows field (Nr index), a codebook information field, a number of subcarriers in group field (grouping Ng), and a partial bandwidth information field (partial BW info).

Figure 5:
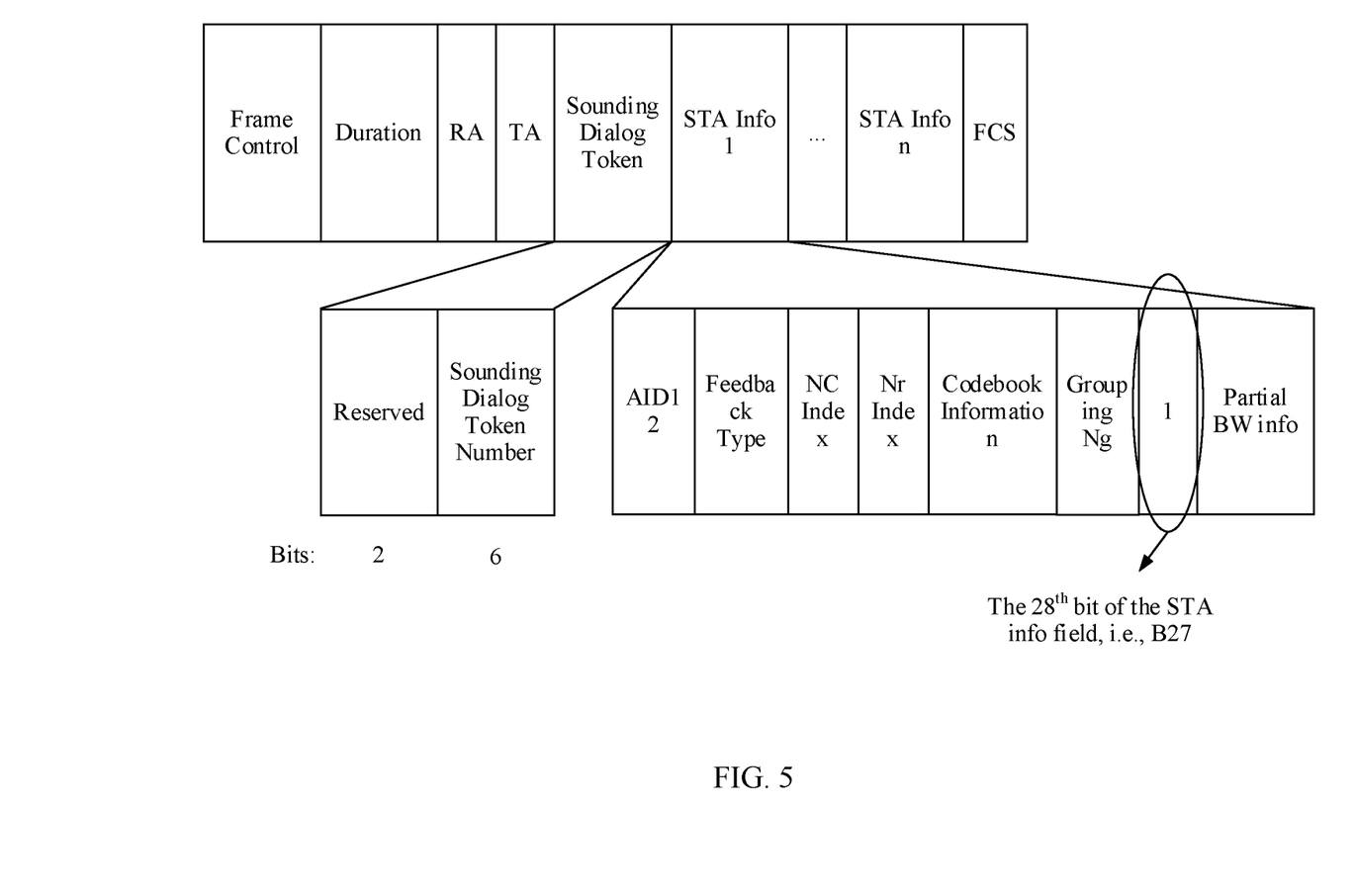
FIG. 5 to FIG. 9 are simple schematic diagrams of preferred formats of an NDPA frame.

Referring to FIG. 5, FIG. 5 is a simple schematic diagram of an HE NDPA frame. Each STA info field of the HE NDPA frame in an example in FIG. 5 is 4 bytes. For ease of description, the front 12 bits of the third and fourth bytes in each STA info field are named as a first information field. Specifically, a value at a most significant bit of the first information field is set to 1, i.e. the $28^{th}$ bit (or referred to as B27) of each STA info field is set to 1 (when the most significant bit is on a right side). When the most significant bit is on a left side, the most significant bit of the first information field is the $17^{th}$ bit (B16). Remaining 11 bits in the first information field may carry other information, such as one or more types of information in the Nr index field, the codebook information field, the grouping Ng field, or the partial BW info field.

When a VHT STA receives and parses the HE NDPA frame, the VHT STA theoretically expects the first information field as an AID12 field. However, in this embodiment of the present application, the most significant bit (Maximum Significant Bit, MSB) in the first information field is set to 1. In this way, when the VHT STA parses the first information field, a value of the first information field is greater than or equal to 2048. However, a value limitation of the AID for a VHT STA should be within 1 to 2007. Therefore, it implicitly indicates to the VHT STA that the first information field is not an AID12 field, and the VHT STA does not need to continue to process the information, thereby preventing wrongly determining by the VHT STA.

Figure 6:
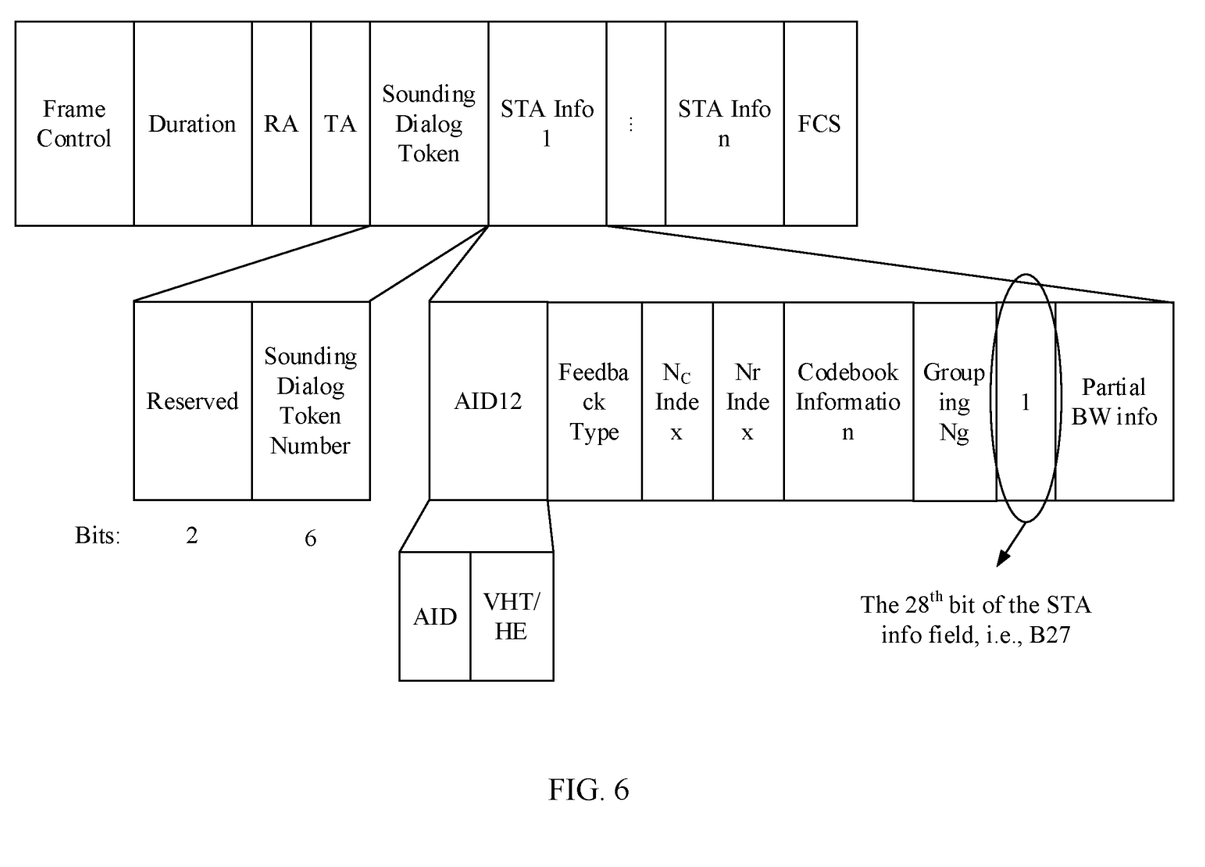

In addition, a most significant bit in an AID12 information field in each STA info field may be set to 0 or 1. When the most significant bit is set to 0, it indicates that the STA info field is the same as a STA info field in a VHT NDPA, which is 2 bytes. When the most significant bit of the AID12 information field is set to 1, it indicates that the STA info field has a length that is of a TA info field and specified in the 802.11ax standard, for example, the length is 4 bytes in this embodiment of the present application. The bit may be referred to as a VHT/HE field, as shown in FIG. 6.

Figure 7:
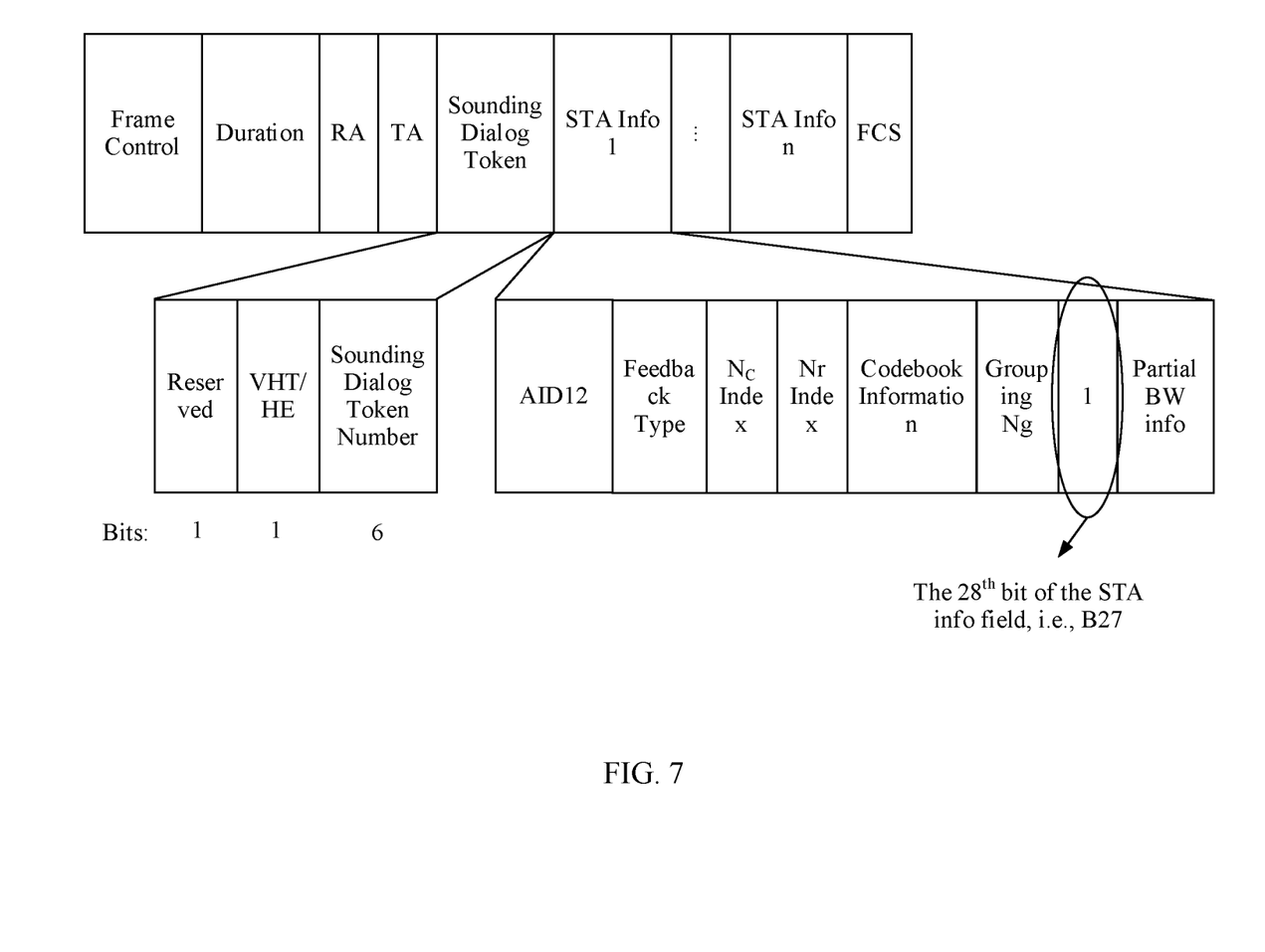

The above mentioned VHT/HE field may be not included in an STA info field, but is in a common information part (all parts before the STA info field are referred to as common information parts) of the radio frame. Preferably, the VHT/HE field may be in a reserved field in a Sounding Dialog Token, as shown in FIG. 7.

Since the B27 is permanently set to 1, user information carried in an HE NDPA frame should be at a location other than the B27, that is, B0-B26 and B28-B31.

In another embodiment, regardless of a value of the VHT/HE field, a length of an STA info field is 4 bytes.

When a receiver receives the HE NDPA frame, if the receiver is a VHT STA, as the VHT STA take each STA info field as 2 bytes by default, the VHT STA firstly parses an AID12 information field, and continues to parse next 2 bytes if a parsed value does not match an AID of the VHT STA. The VHT STA does not obtain, from subsequent 4 bits, information sent to the VHT STA, until the parsed value matches the AID of the VHT STA.

If the receiver is an HE STA, when a value of a VHT/HE field is 0, the HE STA performs receiving according to a receiving process of a VHT STA. When a value of the VHT/HE field is 1, the HE STA performs parsing in a unit of 4 bytes. The HE STA firstly parse an AID12 information field, and continues to parse next 4 bytes if a read value does not match an AID of the HE STA. The HE STA does not obtain, from 19 bits other than the B27 in subsequent 20 bits, information sent to the HE STA, until the parsed value matches the AID of the HE STA. Optionally, if the HE STA finds that a value of the B27 is 0, the receiver stops receiving the information, and discards the NDPA frame.

Example 2

In Example 1, the STA info field of an HE NDPA frame includes 4 bytes. Different from this, in this example, the STA info field of the HE NDPA frame may include 6 bytes, 8 bytes, 10 bytes, or the like. Similar to Example 1, in this example, except the first 2 bytes, an MSB of the front 12 bits is set to 1, in every other 2 bytes.

Figure 8:
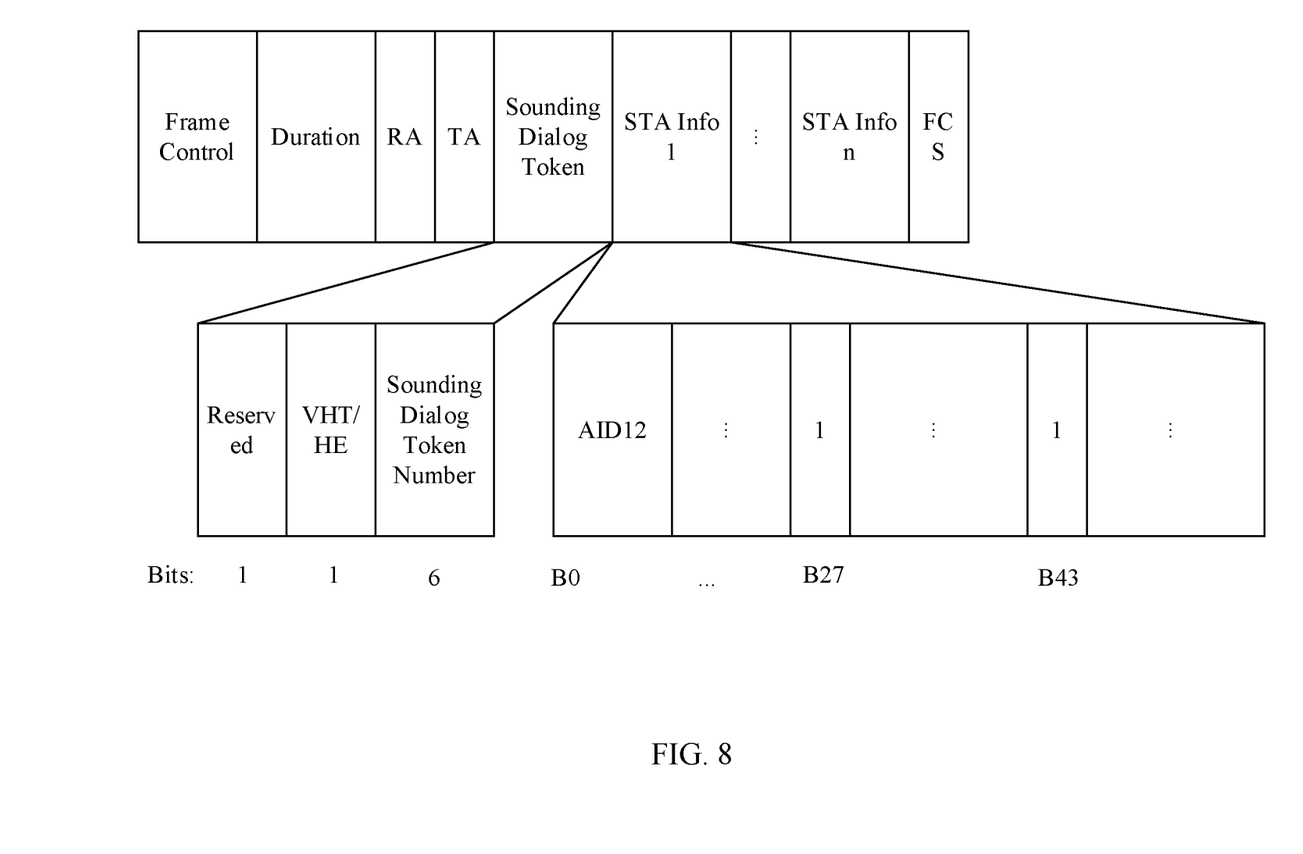

For example, when the STA info field includes 6 bytes, the B27 and B43 in the STA info field are set to 1, as shown in FIG. 8. A VHT/HE field in an example is in a reserved field in a common information part. In addition, when a most significant bit is on a left side, the B16 and B32 are set to 1.

When a receiver receives the HE NDPA frame, if the receiver is a VHT STA, the receiver considers that each STA info field is 2 bytes. The VHT STA firstly parses an AID12 information field, and continues to parse next 2 bytes if a parsed value does not match an AID of the VHT STA. The VHT STA does not obtain, from subsequent 4 bits, information sent to the VHT STA, until the parsed value matches the AID of the VHT STA. If the receiver is an HE STA, when a value of the VHT/HE field is 0, the HE STA performs receiving according to a receiving process of a VHT STA. When a value of the VHT/HE field is 1, the HE STA performs parsing in a unit of 6 bytes. The HE STA firstly parses an AID12 information field, and continues to parse next 6 bytes if a parsed value does not match an AID of the receiver. The HE STA does not obtain, from 34 bits other than B27 and B43 in subsequent 36 bits, information sent to the HE STA, until the parsed value matches the AID of the HE STA. Optionally, if the HE STA finds that a value of B27 or B43 is 0, the HE STA stops receiving the information, and discards the NDPA frame.

Example 3

Figure 9:
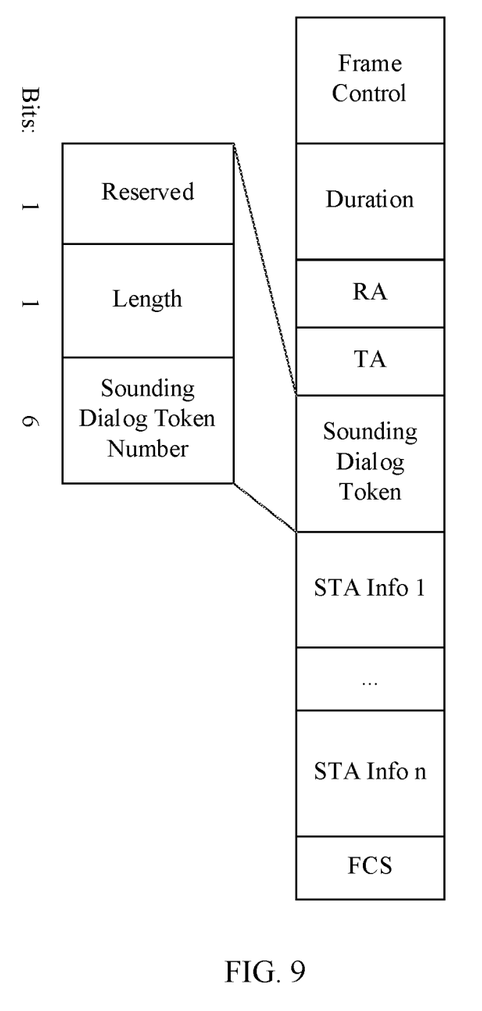

A difference between Example 1 and Example 2 lies in that, defined lengths of an STA info field of the HE NDPA frame are different. However, compared with Example 3, the STA info field in Example 1 and Example 2 has a fixed length. In Example 3, an HE NDPA frame having a variable length is provided. A STA info field of the HE NDPA frame is changeable, and may be 4 bytes, 6 bytes, 8 bytes, 10 bytes, or the like. In order that a receive end obtain a length of the STA info field, an HE NDPA frame may carry a first indication information, to indicate the length of the STA info field. The first indication information should be located before all STA info fields. In an embodiment, the first indication information may be in a reserved field in a sounding dialog token. In a more specific embodiment, 1 bit in the reserved field is used to carry the first indication information. When a value of the 1 bit is 0, it indicates that the length of the STA info field is 4 bytes. When a value of the 1 bit is 1, it indicates that the length of the STA info field is 6 bytes. As shown in FIG. 9, a length field in FIG. 9 is the first indication information.

It should be noted that, the first indication information (that is, the length of the STA info field) is a length of the STA info field when a value of a VHT/HE field (refer to FIG. 6) in an AID12 field is HE (specifically, a bit value is 1, or a bit value is 0).

In another embodiment, regardless of the value of the VHT/HE field, the first indication information indicates the length of the STA info field.

Figure 10:
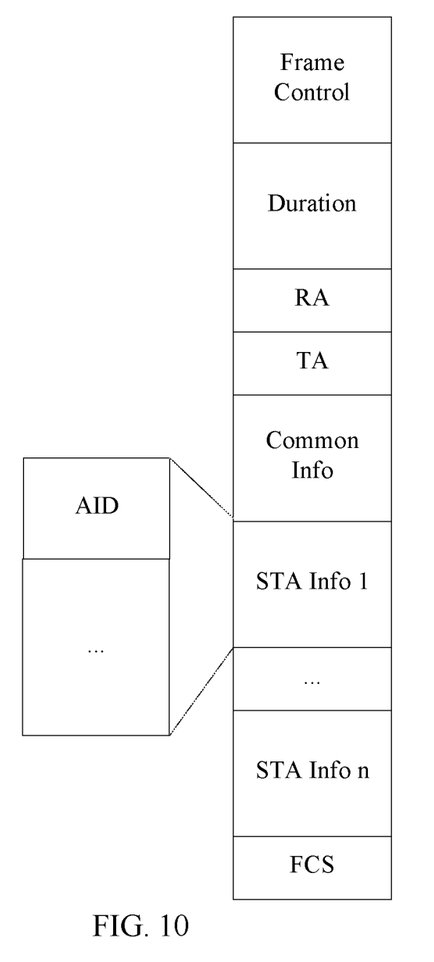
FIG. 10 is a simple schematic diagram of a preferred format of a trigger frame.

Certainly, a frame in the foregoing embodiments is not limited to an NDPA frame, but may be another frame other than the NDPA frame. The another frame has the following characteristics: The another frame includes a common information part and a user information part, and an AID field is the first field in each user information part. A trigger frame (TF) is a type of the another frame, as shown in FIG. 10.

The foregoing methods may also be used in a trigger frame, and lengths of the STA info field in the trigger frame are different. For example, if the STA info field includes M bytes before extension, and if the STA info field needs to be extended to MK bytes (K=1, 2, 3, . . . ), a bit B(8Mj+11) in the STA info field may be set to 1 (j=1, 2, 3, . . . , K−1).

The present application further provides a data transmission apparatus that may perform the foregoing method (including a sending method and a receiving method).

Figure 11:
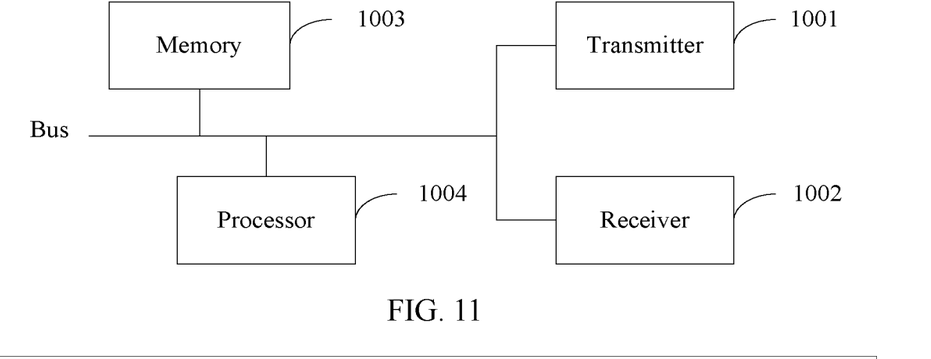
FIG. 11 and FIG. 12 are separately simple schematic diagrams of an apparatus for implementing the embodiments of the present application.

FIG. 11 is an apparatus for transmitting wireless local area network data according to an embodiment of the present application. Referring to FIG. 11, the apparatus includes a transmitter 1001, a receiver 1002, a memory 1003, and a processor 1004 that are configured to perform a method for sending wireless local area network data or a method for receiving wireless local area network data. The apparatus is used on a transmit side, and includes:

the processor 1004, configured to construct or generate a radio frame, where the radio frame is in at least a structure mentioned in the foregoing embodiment; and the transmitter 1001, configured to send the radio frame to a station STA associated with the AP.

Alternatively, the apparatus is used on a receive side and includes the receiver 1002. The receiver 1002 is configured to receive the radio frame in the foregoing embodiment. The processor is configured to parse the radio frame. For detailed processing of the radio frame, refer to the foregoing embodiment. Details are not described herein again.

Figure 12:
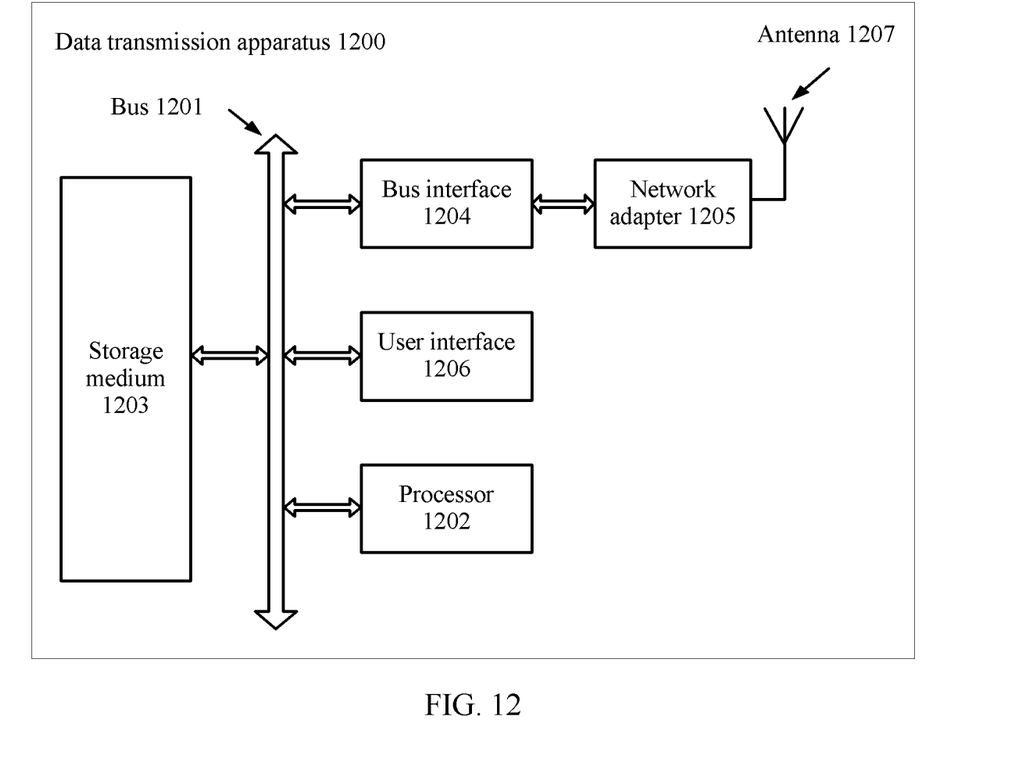

FIG. 12 is an example of a schematic structural diagram of a data transmission apparatus according to an embodiment of the present application (such as an access point, a station, or a chip, and some components in the figure are optional). As shown in FIG. 12, a data transmission apparatus 1200 may be implemented by using a bus 1201 as a general bus architecture. According to constraints on specific applications and overall design of the data transmission apparatus 1200, the bus 1201 may include any quantity of interconnect buses and bridges. The bus 1201 connects various circuits together, and these circuits include a processor 1202, a storage medium 1203, and a bus interface 1204. The data transmission apparatus 1200 uses the bus interface 1204 to connect a network adapter 1205 and the like by means of the bus 1201. The network adapter 1205 may be configured to implement a signal processing function of a physical layer in a wireless local area network, and send and receive a radio frequency signal by using an antenna 1207. A user interface 1206 may connect to a user terminal, such as a keyboard, a display, a mouse, or a joystick. The bus 1201 may further connect to various other circuits, such as a timing source, a peripheral device, a voltage regulator, and a power management circuit. These circuits are well-known in the art, and are not described in detail herein.

The data transmission apparatus 1200 may also be configured as a general processing system. The general processing system includes one or more microprocessors that provide a processor function, and an external memory that provides at least a part of the storage medium 1203. All these are connected to other supporting circuits by using an external bus architecture.

Alternatively, the data transmission apparatus 1200 may be implemented by using an ASIC (application-specific integrated circuit) having the processor 1202, the bus interface 1204, and the user interface 1206, or by using at least a part of the storage medium 1203 integrated into a single chip; or the data transmission apparatus 1200 may be implemented by using one or more FPGAs (field programmable gate arrays), a PLD (programmable logic device), a controller, a state machine, gate logic, a discrete hardware component, any other appropriate circuit, a circuit capable of performing functions described in the present application, or any combination thereof.

The processor 1202 is responsible for managing the bus and general processing (including executing software stored in the storage medium 1203). The processor 1202 may be implemented by using one or more general purpose processors and/or dedicated processors. Examples of the processors include a microprocessor, a microcontroller, a DSP processor, and other circuits capable of executing software. The software should be broadly construed as representation of instructions, data or any combination thereof regardless of whether the software is referred to as software, firmware, middleware, microcode, hardware description language, or others.

FIG. 11 shows that the storage medium 1203 is separated from the processor 1202. However, a person skilled in the art easily understands that the storage medium 1203 or any part thereof may be located outside the data transmission apparatus 1200. For example, the storage medium 1203 may include a transmission wire, a carrier waveform modulated by using data, and/or a computer product separated from a wireless node. These media are accessible by the processor 1202 by using the bus interface 1204. Alternatively, the storage medium 1203 or any part thereof may be integrated into the processor 1202, for example, may be a cache and/or a general purpose register.

The processor 1202 can implement the foregoing embodiments, and details are not described herein.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

What is claimed is:

1. A method for transmitting a radio frame comprising:
   generating, by an apparatus, a radio frame that includes a common information part and a user information part, wherein a field in a sounding dialog token in the common information part indicates information of a standard to which the radio frame corresponds, wherein the standard comprises a first standard or a second standard,
   wherein the user information part comprises one or more station information fields, wherein a length of a station information field is M bytes corresponding to information of the first standard, and a length of a station information field is MK bytes corresponding to information of the second standard, and
   wherein for a station information field that corresponds to information of the second standard, a beginning M bytes of the MK bytes includes an association identifier (AID) field, and each following M bytes of the MK bytes after the beginning M bytes does not include any AID field, wherein M is an even natural number larger than 4, a most significant bit (MSB) of the front 12 bits of the each following M bytes of the MK bytes after the beginning M bytes is set to 1, wherein the MSB of the front 12 bits is a bit B in the station information field, wherein $B=8Mj+11$, wherein $j=1, 2, 3, \ldots, K-1$, and wherein K is a natural number larger than 1; and
   transmitting, by the apparatus, the radio frame.

2. The method according to claim 1, wherein a value of the MSB of the front 12 bits of the each following M bytes of the MK bytes after the beginning M bytes in the station information field is set to 1 to prevent a receive end that does not comply with the second standard from wrongly determining the receive end's AID in the station information field.

3. The method according to claim 2, wherein the value of the MSB of the front 12 bits of the each following M bytes of the MK bytes after the beginning M bytes in the station information field is set to 1 to indicate that the front 12 bits of the each following M bytes is not an AID field.

4. A method for receiving a radio frame, comprising:
   receiving, by a station, a radio frame that includes a common information part and a user information part, wherein a field in a sounding dialog token in the common information part indicates information of a standard to which the radio frame corresponds, wherein the standard comprises a first standard or a second standard,
   wherein the user information part comprises one or more station information fields, wherein a length of each station information field is M bytes corresponding to information of the first standard, and a length of a station information field is MK bytes corresponding to information of the second standard, and
   wherein for a station information field that corresponds to information of the second standard, a beginning M bytes of the MK bytes includes an association identifier (AID) field, and each following M bytes of the MK bytes after the beginning M bytes does not include any AID field, wherein M is an even natural number larger than 4, a most significant bit (MSB) of the front 12 bits of the each following M bytes of the MK bytes after the beginning M bytes is set to 1, wherein the MSB of the front 12 bits is a bit B in the station information field, wherein $B=8Mj+11$, wherein $j=1, 2, 3, \ldots, K-1$, and wherein K is a natural number larger than 1; and
   parsing, by the station, the radio frame according to a value of the MSB of the front 12 bits of the each following M bytes in each station information field.

5. The method according to claim 4, wherein the value of the MSB of the front 12 bits of the each following M bytes of the MK bytes after the beginning M bytes is set to 1 to prevent a receive end that does not comply with the second standard from wrongly determining the receive end's AID in the station information field.

6. The method according to claim 5, wherein the value of the MSB of the front 12 bits of the each following M bytes of the MK bytes after the beginning M bytes is set to 1 to indicate that the front 12 bits of the following M bytes is not an AID field.

7. An apparatus for transmitting a radio frame, the apparatus comprising:
   a processor configured to generate a radio frame that includes a common information part and a user information part,
   wherein a field in a sounding dialog token in the common information part indicates information of a standard to which the radio frame corresponds, wherein the standard comprises a first standard or a second standard,
   wherein the user information part comprises one or more station information fields, wherein a length of a station information field is M bytes corresponding to information of the first standard, and a length of a station information field is MK bytes corresponding to information of the second standard, and
   wherein for a station information field that corresponds to information of the second standard, a beginning M bytes of the MK bytes includes an association identifier (AID) field, and each following M bytes of the MK bytes after the beginning M bytes does not include any AID field, wherein M is an even natural number larger than 4, a most significant bit (MSB) of the front 12 bits of the each following M bytes of the MK bytes after the beginning M bytes is set to 1, wherein the MSB of the front 12 bits is a bit B in the station information field, wherein $B=8Mj+11$, wherein $j=1, 2, 3, \ldots, K-1$, and wherein K is a natural number larger than 1; and
   a transmitter coupled to the processor, wherein the transmitter is configured to transmit the radio frame.

8. The apparatus according to claim 7, wherein a value of the MSB of the front 12 bits of the each following M bytes of the MK bytes after the beginning M bytes in the station information field is set to 1 to prevent a receive end that does not comply with the second standard from wrongly determining the receive end's AID in the station information field.

9. The apparatus according to claim 8, wherein the value of the MSB of the front 12 bits of the each following M bytes of the MK bytes after the beginning M bytes is set to 1 to indicate that the front 12 bits of the each following M bytes is not an AID field.

10. An apparatus for receiving a radio frame, the apparatus comprising:
- a receiver configured to receive a radio frame that includes a common information part and a user information part,
  - wherein a field in a sounding dialog token in the common information part indicates the information of a standard to which the radio frame corresponds, wherein the standard comprises a first standard or a second standard,
  - wherein the user information part comprises one or more station information fields, wherein a length of a station information field is M bytes corresponding to information of the first standard, and a length of a station information field is MK bytes corresponding to information of the second standard, and
  - wherein for a station information field that corresponds to information of the second standard, a beginning M bytes of the MK bytes includes an association identifier (AID) field, and each following M bytes of the MK bytes after the beginning M bytes does not include any AID field, wherein M is an even natural number larger than 4, a most significant bit (MSB) of the front 12 bits of the each following M bytes after the beginning M bytes is set to 1, wherein the MSB of the front 12 bits is a bit B in the station information field, wherein B=8Mj+11, wherein j=1, 2, 3, . . . , K−1, and wherein K is a natural number larger than 1; and
- a processor coupled to the receiver, wherein the processor is configured to:
  - parse the radio frame according to a value of the MSB of the front 12 bits of the each following M bytes in the station information field.

11. The apparatus according to claim 10, wherein the value of the MSB of the front 12 bits of the each following M bytes of the MK bytes after the beginning M bytes is set to 1 to prevent a receive end that does not comply with the second standard from wrongly determining the receive end's AID in the station information field.

12. The apparatus according to claim 11, wherein the value of the MSB of the front 12 bits of the each following M bytes of the MK bytes after the beginning M bytes is set to 1 to indicate that the front 12 bits of the each following M bytes is not an AID field.

13. The method according to claim 1, wherein the radio frame is a trigger frame.

14. The method according to claim 4, wherein the radio frame is a trigger frame.

15. The apparatus according to claim 7, wherein the radio frame is a trigger frame.

16. The apparatus according to claim 10, wherein the radio frame is a trigger frame.

* * * * *